Dec. 5, 1967 W. F. GALEY 3,356,478
METHOD OF SHIFTING GLASS ON A MOLTEN METAL BATH
Filed June 4, 1965 2 Sheets-Sheet 1
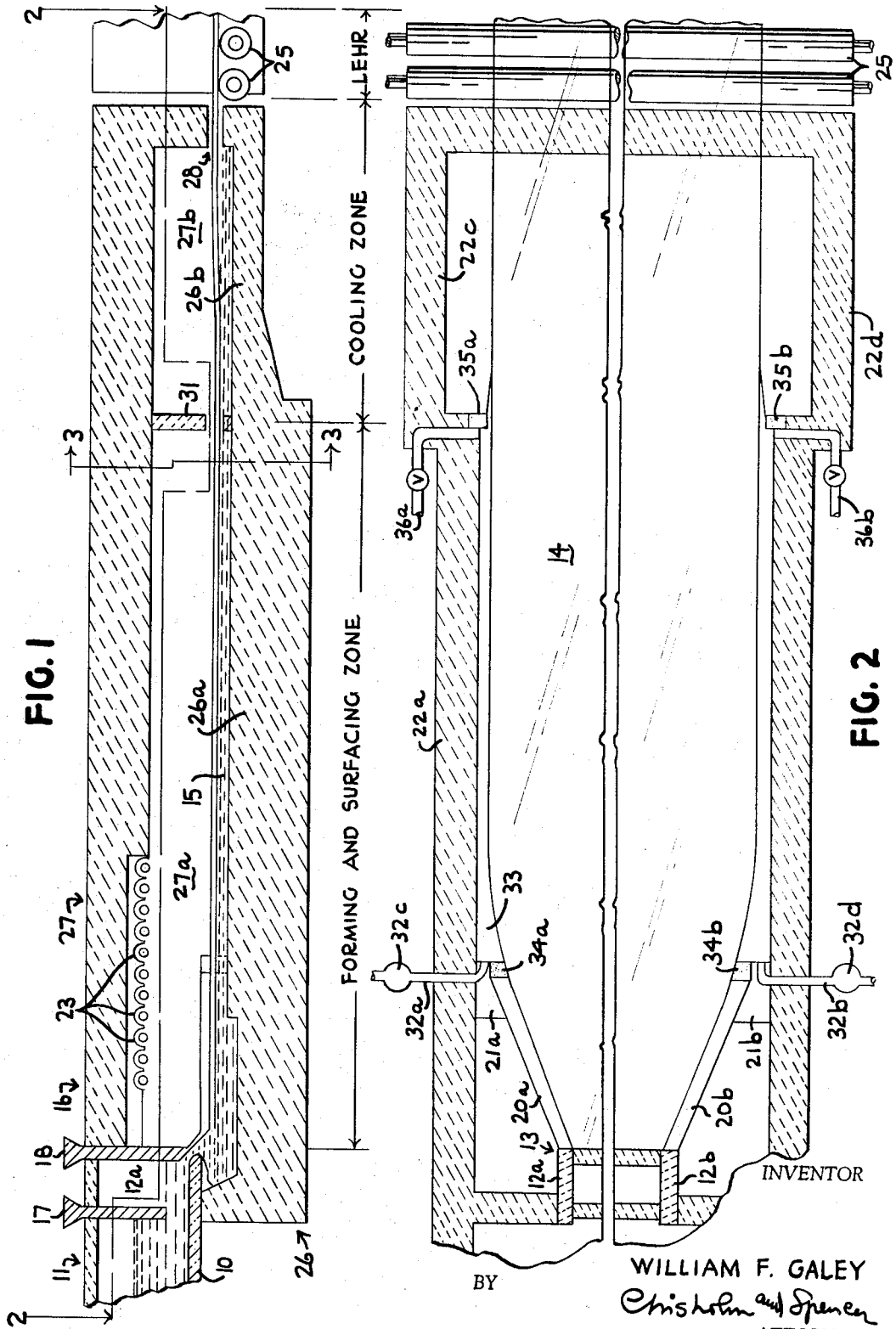
INVENTOR
WILLIAM F. GALEY
BY Chisholm and Spencer
ATTORNEYS

INVENTOR
WILLIAM F. GALEY
ATTORNEYS

United States Patent Office 3,356,478
Patented Dec. 5, 1967

3,356,478
METHOD OF SHIFTING GLASS ON A MOLTEN METAL BATH
William F. Galey, Saxonburg, Pa., assignor to Pittsburgh Plate Glass Company, Pittsburgh, Pa., a corporation of Pennsylvania
Filed June 4, 1965, Ser. No. 461,471
4 Claims. (Cl. 65—99)

ABSTRACT OF THE DISCLOSURE

The tendency of flat glass manufactured by floating glass on a liquid bath to drift from a desired path as it advances along the bath is overcome by introducing a molten material other than glass to the surface of the bath between at least one edge of the glass and the sidewall of the tank adjacent thereto to shift the glass laterally on the bath into a desired path of movement.

---

This invention relates to the manufacture of flat glass by floating glass on a liquid bath, such as molten metal. During the manufacture of such glass, there is a tendency for the glass to drift from a desired path as it is advanced along the bath. Such drifting has been attributed to convection currents in the molten bath or to hydrodynamic instability.

In addition to the use of edge gripping means which will steer a ribbon of glass along a desired, predetermined path as it is advanced along the bath, it has been suggested to vary the local temperature of the bath by passing a temperature controlled fluid through a control element so as to introduce localized thermal differences in the bath which will introduce controlled convection currents and thus control the position of the glass on the bath. Both methods are not desirable. Edge gripping means introduce attenuation defects into the ribbon which lower the optical quality of the glass. Thermal steering upsets the bath operating conditions and causes production difficulties.

In my copending application, Ser. No. 366,961, filed May 13, 1964, and entitled, "Manufacture of Glass," there is disclosed a method for producing glass having thicknesses differing from the "equilibrium thickness," i.e., that thickness of glass ultimately formed when molten glass flows unhindered on a liquid bath. The method utilizes an edge material which wets the tank side walls and contacts the glass on the bath. By varying the depth of the edge material, different thicknesses of glass may be obtained.

It has been found that steering of the glass on the bath can be effected while the glass is being sized or surfaced by using an edge material differing from the glass and in a manner similar to that disclosed in the aforesaid copending application. The process is applicable to the manufacture of equilibrium or other thickness glass. The edge material required for ribbon steerage need not adhere to the tank walls, as is required for the sizing process disclosed in the copending application. However, there must be a sufficient quantity of the material to completely cover the exposed bath between the ribbon and the glass in the zone of the tank where the steerage problem is most acute.

According to this invention, the edge material can be delivered at different volume rates onto the surface of the molten bath at each side of the glass, so as to completely cover the bath, so that the depth at one edge of the ribbon can be urged to be greater than that at the other edge of the ribbon. The hydrodynamic forces will tend to equalize each other, i.e., the depth of the material at each edge of the ribbon will tend to equalize and, by doing so, will apply an unbalanced force against one edge of the ribbon. The ribbon will shift its position until the forces equalize. Thus, it is possible, by observing ribbon position, to introduce edge material at a greater rate at one edge of the ribbon than at the other edge of the ribbon and to correct the ribbon position. Steering of the ribbon occurs with little, if any, time delay.

The particular edge material should be chosen so as not to flow under or over the glass and to be stable at the operating temperatures, for example, between 2100° F. and 1200° F. If it is used only in the surfacing portion of the arrangement, the temperature range can be adjusted so that it is stable between 2100° F. and 1400° F. Actually, it is preferred to steer the ribbon in the surfacing zone where the temperature of the glass is above 1400° F.

To further understand the invention, reference is now made to the accompanying drawings, in which:

FIG. 1 is a longitudinal section of an apparatus for producing glass according to the inventive process herein disclosed, showing means for depositing a layer of glass upon a molten bath;

FIG. 2 is a horizontal sectional view taken on line 2—2 of FIG. 1 and showing an edge material between the edge of the glass and the tank wall throughout the surfacing and sizing zone of the apparatus;

Figure 3:
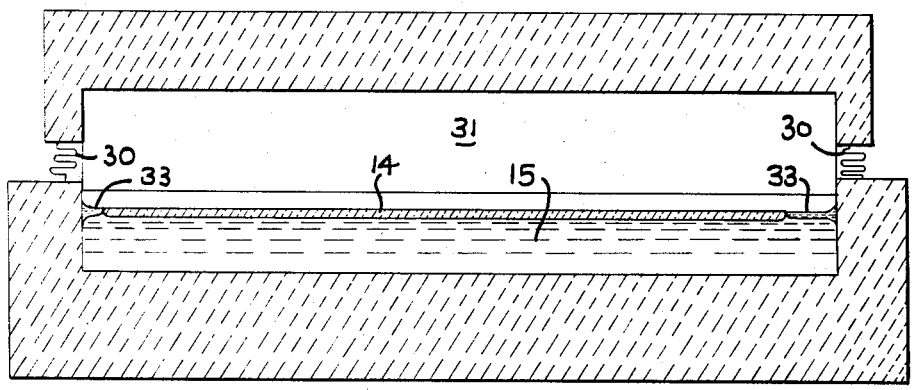
FIG. 3 is a sectional view taken on line 3—3 of FIG. 2 and showing different thicknesses of edge material to steer the ribbon.
Figure 4:
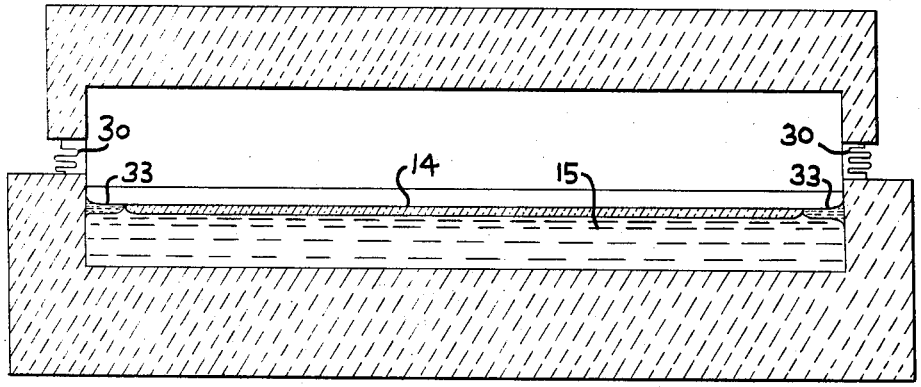
FIG. 4 is a view similar to FIG. 3 showing the ribbon in its desired path with the edge material at the same level at both edges of the ribbon.

With particular reference to the drawings, there is shown a floor or lip 10 of a glass melting furnace 11 which, with side jambs 12a and 12b, forms a spout 13 of generally rectangular cross section at the delivery end of the furnace 11. Glass discharging from the spout 13 forms a layer of glass 14 on the surface of a bath of molten metal 15 contained within a tank 16. The metal may be tin, an alloy of tin, or the like, so long as it is of greater density than the glass discharged thereon and substantially immiscible and non-reactive with the glass. A glass flow regulating tweel 17 and a gate 18, each adjustably suspended in a conventional manner, cooperate with the spout and control the flow of glass from the furnace 11 to the molten metal bath 15.

The molten metal bath 15 is confined within a tank 16 which includes refractory side walls 20a and 20b diverging from the spout 13 and terminating in short stub walls 21a and 22b. The stub walls 21a and 21b join side walls 22a and 22b which in turn join side walls 22c and 22d. The tank 16 is thus stepped in width from one end to the other, as is clearly shown in FIG. 2. The side walls of the tank are preferably constructed of a suitable refractory material.

In order to maintain the metal of the bath 15 in molten condition, and to thermally control the ribbon near the entrance end of the tank 16, thermal regulating means, such as radiant heaters 23 are located in the roof of the tan. The radiant heaters 23 are connected to a suitable source of power (not shown) in a conventional manner. Each heater may be individually energized and controlled, so as to provide a desired thermal gradient within the tank 16.

The glass 14 in finished ribbon form is withdrawn from the tank 16 without injury to its surfaces by the traction rolls of a roller conveyor 25. The rolls provide sufficient traction to remove the glass 14 but insufficient to attenuate the glass.

The tank 16 is constructed of a bottom portion 26 and a top portion 27 joined except for the entrance and an exit 28 by suitable means such as that shown, which includes bellows 30. This type of construction, shown for illustrative purposes, permits the top portion 27 of the tank to be raised from the bottom portion 26 for repairs, etc., without the necessity of removing refractory parts and the subsequent repair of removed parts. The bottom portion 26 of the tank 16 contains the molten metal bath 15 and includes the various described side walls. The bottom portion 26 contains a forming and surfacing zone 26a and a cooling zone 26b, these zones being present because of the temperatures involved. The metal level is maintained in any suitable manner.

The top portion 27 of the tank 16 is also divided into two major sections, i.e., the section 27a which is coextensive with and corresponds to the forming and surfacing zone and the section 27b which is coextensive with and corresponds to the cooling zone. The sections 27a and 27b are separated by a depending wall 31. Radiant heaters 23 provide the heat to temperature condition the glass in the forming and surfacing zone. The glass exits from the zone in substantially finished and solidified condition.

In addition to the structure thus described, there are inlet conduits 32a and 32b passing through the stub walls 21a and 21b, respectively, and terminating at just about the level of the bath 15. These conduits are separately connected at their opposite ends to a suitable source of a material through separate metering devices, schematically shown at 32c and 32d. The metering devices, which may be pumps of known construction are thus not illustrated in detail. The material metered and fed through the conduits 32a and 32b is the edge material previously described which is of less density than the metal of the bath 15. The edge material identified as 33 is discharged onto the surface of the bath in sufficient quantity to completely fill the spaces between the glass ribbon and the side walls of the tank at least throughout a portion of the forming and surfacing zone 26a and for discharge of glass from this zone, it must be liquid at the terminus of the walls 22a and 22b.

In order to liberate the the glass from the walls 20a and 20b, there are nose blocks 34a and 34b of a material non-wettable by the glass, such as graphite, at the terminal ends of the walls. Nose blocks 35a and 35b of not-wettable material, such as graphite are also provided at the ends of the walls 22a and 22b to prevent the lapping of the material 33 therearound.

Conduits 36a and 36b are discharge conduits for the material 33 and terminate, at one end, just about the level of the bath 15 and at a sump (not shown) at the other end. Valve means 36c and 36d are incorporated into the conduits for adjusting the rate of discharge of the material through the conduits.

The edge material 33 could extend throughout the length of the tank without departing from the spirit of the invention. Of course, the material 33 would have to be fluid at the temperatures encountered in the zone 27b.

As previously stated, a ribbon of glass being processed on a liquid bath has a tendency to "snake," i.e., shift its position with respect to the desired path through the tank. The edge material 33 can be employed to steer the ribbon. This is accomplished by providing a layer of material along one edge of the ribbon of different depth than that provided along the other edge of the ribbon. The metering pumps and valves in the conduits 32a, 32b and 36a, 36b, provide a suitable depth control for the material 33.

Because of the hydrostatic forces involved, the layers of material 33 will seek the same level, so that when the ribbon shifts toward one side wall of the tank, the depth of the material 33 therebetween is increased. The material 33 can be continuously maintained between the ribbon edges and the tank side walls or it may be introduced as and when needed.

One example of an edge material which can be used to practice the described process is the alkali metal salt sodium molybdate having the chemical formula $$Na_2MoO_4.$$

This salt has a density of 2.50 grams per cubic centimeter at 2000° F. and a surface tension to the atmosphere at the same temperature of 214 dynes per centimeter. The surface tension of the salt to molten tin is 400 dynes per centimeter. Sodium molybdate has a melting point of 1269° F.

It will be understood that various other liquids may be used as edge materials in lieu of the above-mentioned sodium monomolybdate. Generally speaking, the liquid resting on the molten metal at the edges of the glass and in contact with the walls of the container should have the following characteristics:

It should be molten at glass forming temperatures, i.e., melt at about 1200° F. It should be substantially non-volatile at glass forming temperatures, i.e., in the range of about 1200° F. to 2000° F. It should be stable at these temperatures. It should have only a low solubility, if any, in the glass.

Among the other edge materials, the following are contemplated (preferably salts of metals in the alkali metal group above lithium):

Other alkali metal monomolybdates such as potassium monomolybdate or mixtures of two or more alkali monomolybdates, for example, mixtures of potassium and sodium monomolybdates which become molten below about 1300° F.

Phosphomolybdates including melts prepared by mixing $MoO_3$ with sodium metaphosphate or like alkali metal metaphosphate to reduce the melting point of the molybdenum oxide.

Salts of polymolybdic acids having the formula $(MaO_b)(MoO_3)x$,

Where $x$ is the number (including fractional numbers) larger than one and $a$ and $b$ are small whole numbers denoting the respective valence of the metal M. Typical polymolybdates are the alkali metal polymolybdates having the formula $A_2O(MoO_3)x$.

Where A is the alkali metal preferably above lithium in the alkali metal series. As a typical example, potassium polymolybdates containing in excess of about 30 and less than 90 mole percent $MoO_3$ are contemplated.

Alkali metal tungstates and polytungstates, such as those having the formula $Na_2O(WO_3)x$, Where $x$ is a number (including fractional numbers) equal to or greater than one and the corresponding potassium salt or mixtures of the sodium and potassium salts. For example, sodium polytungstates containing 20 to 37 percent $WO_3$ or potassium polytungstates containing 35 to 55 mole percent of $WO_3$.

Other similar alkali metal salts of inorganic heteropolyacids may also be used, such as alkali metal tungstomolybdates.

In addition, sodium and potassium chlorides, and sodium and potassium bromides and mixtures thereof.

The invention herein described may be advantageously combined with the invention described and claimed in my copending application, Serial No. 366,961. In that application, there are set forth various parameters affecting the edge material because of its effect on the thickness of the glass while the invention herein described can use a wider variety of materials because sizing of the glass need not necessarily be accomplished. Of course, however, sizing and steering can be combined. To do so, it is only necessary to establish a different depth of edge material at opposite edges of the ribbon when necessary in accordance with the inventive principles above described.

The invention is applicable to the described process wherein a ribbon of glass is formed on the surface of the bath, as well as to an alternative process wherein a preformed ribbon is delivered onto the bath for sizing and smoothing or just for smoothing. In any event, the ribbon is cooled as it passes through the cooling zone and is removed by lehr rolls 25 without damage to its lower surface.

It is also possible to further subdivide the zones at the sides of the ribbon into a number of smaller divisions and to introduced material at different volume rates into the divisions for more precise control of the ribbon steerage or to feed different materials into different divisions. Further, each division need not be the same length but may be of different length.

In addition, although while not as desirable as proceeding according to the previously described process, it is possible to apply this invention to the attenuation process of producing float glass because even in that process, the ribbon tends to snake.

I claim:

1. In a method for producing flat glass wherein a layer of molten glass is floated on and moved over a wider bath of molten metal contained between sidewalls of a tank and wherein the glass has a tendency to deviate from a desired path, the improvement which comprises: introducing a layer of a material other than the molten glass onto the surface of the bath between one edge of the molten glass and the adjacent sidewall of the tank and covering the entire surface of the bath therebetween with said material for at least a portion of the length of said tank in an amount sufficient to shift said glass laterally on said bath, said material being molten, non-volatile and stable at the operating temperatures and being substantially insoluble in said glass.

2. In a method for producing flat glass wherein a layer of molten glass is supported on and moved over a wider bath of molten metal contained between sidewalls of a tank and wherein the glass has a tendency to deviate from a desired path, the improvement which comprises:
introducing a layer of a material other than the molten glass onto the surface of the bath between one edge of the molten glass and the adjacent sidewall and covering the entire surface of the bath therebetween with said material for at least a portion of the length of the tank,
introducing a layer of a material of a different depth onto the surface of the bath between the other edge of the molten glass and the adjacent sidewall and covering the entire surface of the bath therebetween for the same length portion of the tank,
to shift said glass laterally on the bath and said layers become equalized in depth,
said material of said layers of material introduced onto the surfaces of the bath at the edges of the glass being molten, non-volatile and stable at operating temperatures and being substantially insoluble in said glass.

3. In a method for producing flat glass wherein a layer of molten glass is supported on and moved over a wider bath of molten metal contained between sidewalls of a tank and wherein the glass has a tendency to deviate from a desired path, the improvement which comprises:
introducing a layer of a material other than the molten glass onto the surface of the bath between one edge of the glass and the adjacent sidewall of the tank at one volume rate,
covering the entire surface of the bath between said glass and said sidewall of said tank for a portion of the length of the tank,
introducing a layer of a material other than the molten glass onto the surface of the bath between the opposite edge of the glass and the adjacent sidewall of the tank and opposite to the first named edge of the glass at a different volume rate,
covering the entire surface of the bath between said glass and said second-named adjacent sidewall of said tank for a portion of the length of the tank,
to shift said glass laterally on the bath,
said material of said layers of material introduced onto the surfaces of the bath at opposite edges of the glass being molten, non-volatile and stable at operating temperatures and being substantially insoluble in said glass.

4. In a method for producing flat glass wherein a layer of molten glass is floated on and moved over a wider bath of molten metal container between side walls of a tank and wherein the glass has a tendency to deviate from a desired path, the improvement which comprises:
dividing the space between the side walls and the glass into a plurality of zones, introducing different quantities of material other than the molten glass onto the surface of the bath between said glass and said side walls in at least some of said zones and covering the entire surface of the bath between said glass and said side walls in said zones into which said material is introduced,
to shift said glass laterally on said bath,
said material of said layers of material introduced onto the surfaces of the bath adjacent the edge of the glass being molten, non-volatile, and stable at operating temperatures and being substantially insoluble in said glass.

References Cited

UNITED STATES PATENTS

| 3,223,503 | 12/1965 | Barradell-Smith et al. | 65—99 |
| 3,264,081 | 8/1966 | Pilkington | 65—99 |
| 3,266,880 | 8/1966 | Pilkington | 65—99 |
| 3,317,299 | 5/1967 | Bre | 65—99 |

FOREIGN PATENTS

| 1,354,805 | 2/1964 | France. |

DONALL H. SYLVESTER, *Primary Examiner.*

G. R. MYERS, *Assistant Examiner.*